United States Patent [19]

Schneider

[11] 3,787,644

[45] Jan. 22, 1974

[54] MAGNETIC HEAD ADJUSTMENT ASSEMBLY

[75] Inventor: Guenter E. Schneider, Concord, Mass.

[73] Assignee: Digital Equipment Corporation, Maynard, Mass.

[22] Filed: July 12, 1972

[21] Appl. No.: 271,135

[52] U.S. Cl. .................................... 179/100.2 CA
[51] Int. Cl. .......................................... G11b 5/56
[58] Field of Search ........... 179/100.2 C, 100.2 CA; 340/174.1 F; 346/74 MP

[56] References Cited

UNITED STATES PATENTS

| | | | |
|---|---|---|---|
| 3,544,980 | 12/1970 | Applequist | 179/100.2 CA |
| 3,626,113 | 12/1971 | Jones | 179/100.2 CA |

*Primary Examiner*—Vincent P. Canney
*Attorney, Agent, or Firm*—Cesari and McKenna

[57] ABSTRACT

Alignment apparatus for a pair of transducers in a magnetic memory having a single magnetic disk. An elongated mount for each transducer extends along a normally horizontal suspension axis. The two mounts are spaced vertically in a carriage to position the respective transducers adjacent opposite disk surfaces. Each mount has a semi-cylindrical positioning surface on which a pair of flats are formed. Radially extending lugs with semi-cylindrical surfaces and the positioning surface constitute a cylinder which fits in a bore in the carriage. A positioning screw and locking screw are oriented to engage a wedging surface and a flat associated with the upper mount. Another positioning screw and locking screw are vertically offset from lugs on the upper mount. They engage a wedging surface and flat of the lower mount because it is rotated 180° with respect to the upper mount.

5 Claims, 5 Drawing Figures

MAGNETIC HEAD ADJUSTMENT ASSEMBLY

BACKGROUND OF THE INVENTION

This invention generally relates to magnetic data storage devices and more specifically to apparatus for mounting a magnetic transducer in such a device.

One type of magnetic data storage device is a disk memory which comprises a disk, transducers for reading or writing data from or onto recording surfaces on opposite sides of the disk and a carriage for moving the transducers. The disk, which rotates at high speeds on a disk drive, contains a plurality of closely spaced, concentric magnetic data tracks. A carriage supports one magnetic transducer (or more commonly "head") in close proximity to each recording surface. When the carriage moves, both heads move concurrently so that at any given position they are on a "cylinder" defined by corresponding recorded tracks on the two recording surfaces. As apparent, alignment of each head with its respective tracks is very critical if the data is to be read or written accurately. This can be a problem in so-called "disk-pack" memories.

In these memories, the disk is a replaceable component which may arbitrarily be mounted on any one of several disk drives. If the heads on all the disk drives are not aligned to a given reference, then reading or writing errors can occur. Therefore, it is necessary to assure that the heads in each disk drive align to a standard track. Usually, the alignment procedure includes placing a "standard" record on a disk drive and causing the carriage to move to a reference track. Then the output from the memory is monitored and the head is positioned in the carriage until it is aligned over the reference track. When all the disk drives are aligned in this manner, a disk can be arbitrarily loaded in any disk drive.

Some prior systems use simple alignment to position the head with respect to the reference track apparatus. In one, a dowel pin is affixed to the head suspension. A set screw locks the dowel pin in place. When the set screw is loosened, the dowel pin may rotate and move along its longitudinal axis. Normally, the alignment requires that the record is rotating, so some type of fixture must prevent any rotational motion. Rotational head motion could, by virtue of the proximity of the head and record, cause damage to either the head or the record.

Another system uses a non-rotatable mount. This mount connects to the carriage and has a side section with a slot. A locking screw passes through the slot and is threaded into the carriage. Track alignment is obtained by loosening this locking screw, positioning the head with respect to the carriage and then tightening the locking screw. While this mount restrains head rotation, neither it nor the dowel pin provides a positive stop for positioning the head. Therefore, alignment accuracy is based almost exclusively on the manual dexterity of the person installing the head.

Alignment apparatus which does include a variable position stop comprises a solid mount extending along a head suspension axis with the wedging surface for engaging a positioning screw. The installer merely applies pressure to the head and turns the positioning screw until the head and track align. Then he tightens a locking screw. While this approach is simple in concept, it is difficult to implement because the two heads associated with a single record disk are vertically aligned in the carriage. Usually, only the top carriage surface is accessible because carriage and housing components block the carriage sides and bottom. Therefore, this approach is not readily adapted to single-disk memories because it is necessary to locate at least one positioning screw and one locking screw in a relatively inaccessible location.

Therefore, it is an object of this invention to provide an apparatus which simplifies magnetic head alignment in a single-disk memory.

Another object of this invention is to simplify the head alignment over reference tracks on each side of a record in a single-disk memory.

SUMMARY

In accordance with my invention, I provide a positioning screw and locking screw for each head mount. The mounts are identical and extend along the suspension axes for their respectively supported heads. A carriage supports each mount in one of two horizontal, vertically aligned bores. One longitudinal portion of each mount forms a partially cylindrical positioning surface which is interrupted at an intermediate position by the flats. Radially extending lugs, which are offset from the flats, terminate with arcuate surfaces which, together with the positioning surface, provide a pair of cylindrical surfaces that closely interfit with one of the bores. The mount ends at a wedging surface.

One positioning screw and locking screw contact one wedging surface and a flat on the upper mount. Another set, offset from the first set, pass by the upper mount through spaces defined by the lugs thereon. But these screws contact the lower mount which is rotated 180° about the suspension axis with respect to the upper mount.

As apparent, this mounting arrangement greatly simplifies the alignment procedure. Locking and positioning screws for both heads are accessed easily from the top of the carriage, which is the most accessible position. The locking screws also simplify alignment because when they are loosened enough to permit the mount to move, they still bear against their respective flats to prevent any rotation.

This invention is pointed out with particularity in the appended claims. The above and further objects and advantages of this invention may be more readily understood by referring to the following description taken in conjunction with the accompanying drawings.

DESCRIPTION OF AN ILLUSTRATIVE EMBODIMENT

Figure 1:
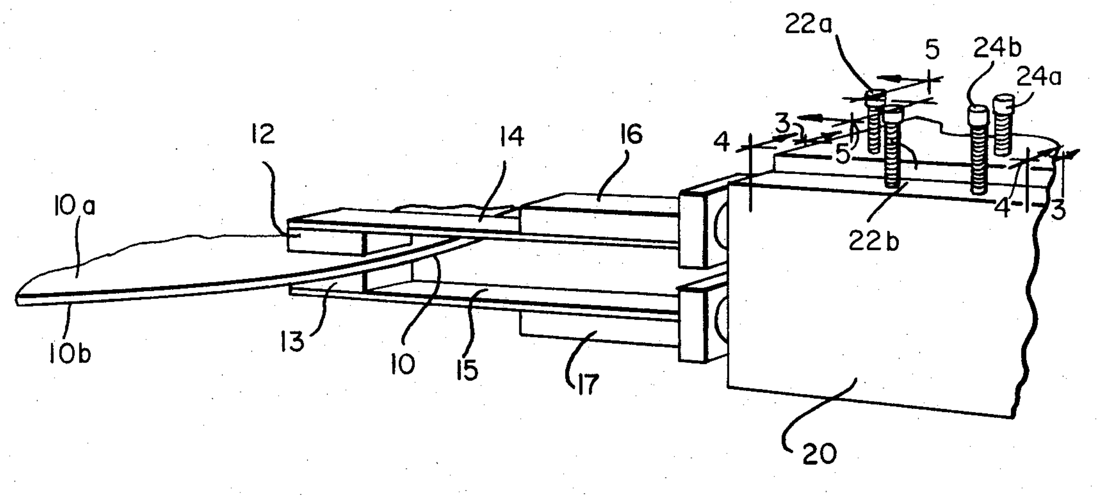
FIG. 1 pictorially illustrates a portion of the magnetic disk memory adapted for utilizing this invention.

FIG. 1 shows a magnetic disk memory with a single disk 10 having opposite recording surfaces 10a and 10b. The disk 10 rotates on a hub (not shown) under control of various drive and control mechanims which form no part of this invention. There are two magnetic transducers, or heads, 12 and 13 associated with the disk 10, one adjacent each recording surface. Each head senses changes in magnetic characteristics of the disk passing adjacent to it (reading) or alters the magnetic state of any position on the disk (writing).

Spring webs 14 and 15 support heads 12 and 13, respectively, along horizontal suspension axes. The webs 14 and 15 connect through springs to mounts 16 and 17, respectively, and the mounts, in turn, are supported by a carriage. As the carriage 20 moves to or from the center of the disk 10, the heads 12 and 13 move simultaneously.

In accordance with my invention, each head aligns with the tracks on the disk side in a simplified manner. Generally, the carriage 20 is moved to a reference position. Then the person installing the equipment loosens a locking screw 22*a*, rotates a positioning screw 24*a* while keeping pressure on the mount 16 with his finger to extend or retract the head 12 while monitoring signals the head senses. Once the head 12 is aligned, the installer tightens the locking screw 22*a*. Then he aligns the head 13 using screws 22*b* and 24*b*.

Figure 2:
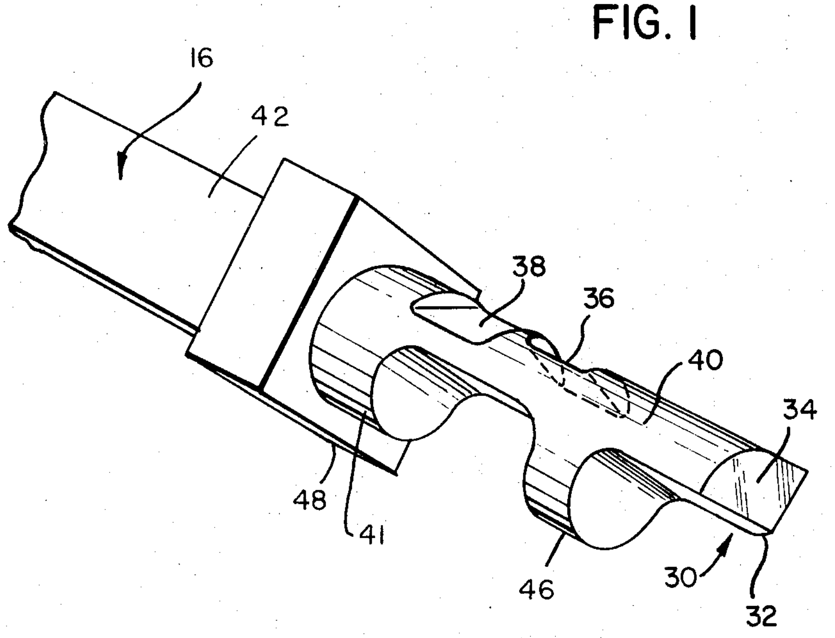
FIG. 2 is a perspective view of a mount constructed in accordance with this invention.

As shown in FIG. 2, the mount 16 is generally cylindrical, with an end portion 30 formed with oppositely extending wedging surfaces 32 and 34. Two flats 36 and 38 are formed in a surface portion 40 between the end portion 30 and a web support 42. Portions of the mount directly under the end portion 30 and the flats 36 and 38 are cut away. The remaining portions or lugs 41 and 46 end in circular surfaces. These surfaces and the surface 40 coact to interfit with a bore in the carriage 20. A rectangular flange 48 separates the interfitting portion of the mount 16 and the web support portion 42.

Figure 3:
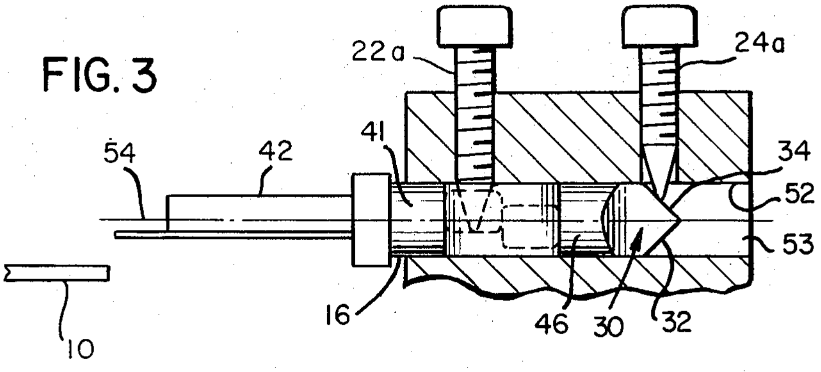
FIG. 3 is a sectional view taken along lines 3—3 in FIG. 1.
Figure 4:
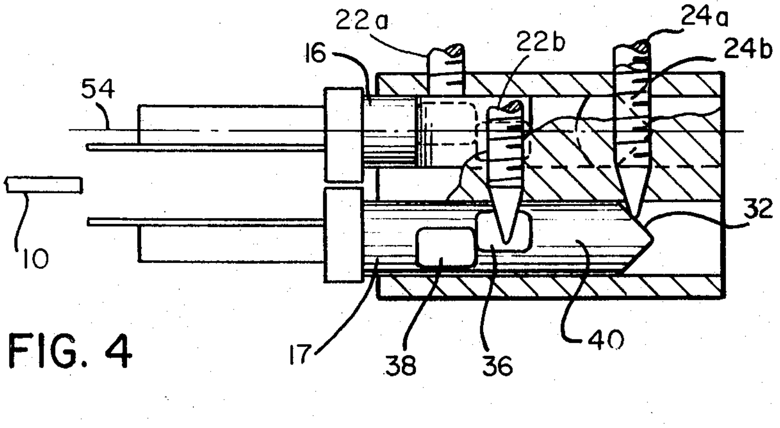
FIG. 4 is another view taken along lines 4—4 in FIG. 1.

This is more clearly shown in FIGS. 3 and 4 where the surfaces 40, 41 and 46 contact the inner surface 52 of a bore 53, thereby fixing the vertical and transverse horizontal positions of the mount 16. These FIGURES also show the relationship of the positioning and locking screws. Positioning screw 24a lies in a vertical axis in a plane normal to the suspension axis 54. As a result, it contacts the wedging surface 34 on the mount 16 while screw 24*b* contacts the wedging surface 32 on mount 17. As the positioning screw 24*a* advances downwardly, it displaces the mount 16 to the left.

Figure 5:
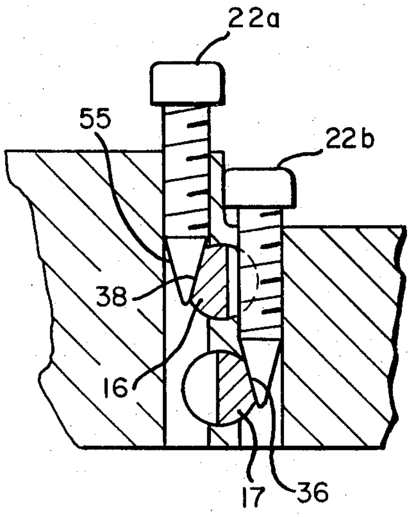
FIG. 5 is a view taken along lines 5—5 in FIG. 1.

Now referring to FIG. 5 and specifically to locking screw 22a and mount 16, the screw 22*a* terminates in a conical surface 55 which mates with the flat 38. As a result, when the screw 22*a* is loosened slightly, the mount 16 can slide in the bore 53, but the flat 38 and conical surface 55 prevent any significant rotation.

As shown in FIG. 4, the lower mount 17 is oriented 180° about its suspension axis with respect to the mount 16. This places the wedging surface 32 and the flat 36 directly below the positioning screw 24*b* and locking screw 22*b*, respectively. These screws are displaced horizontally with respect to the screws 22*a* and 24*a* so that they pass through the relieved portions defined by lugs 41 and 50 in mount 16 (FIG. 2). Hence, the screws 22*b* and 24*b* engage the mount 17 without interferring with the mount 16.

Therefore, a magnetic disk assmebly which incorporates head alignment apparatus is much simpler to align than prior systems. Relieving each mount opposite the flats and wedging surfaces permits a common mount and suspension configuration to be used without complicating alignment. Furthermore, this structure enables all adjustments to be made from above the carriage. The locking screws and flats further simplify alignment because they eliminate any significant head rotation.

Large angular movements of the heads about their respective suspension axes are minimized with this structure. Normally, the heads are aligned while the disk rotates; during operation the heads tend to be stable due to aerodynamic conditions. If the locking screws move a minimum amount, they also prevent rotation. Even larger rotations during alignment or during assembly may be eliminated by constructing the mounts with closely spaced flanges 48 which interfere when either one rotates. Alternatively, the block 20 might contain a projection for engaging the mounts, especially the flanges 48.

It will be apparent that these and various other modifications and alterations can be made to the mounting member described above. Specifically, different head arrangements may be substituted for the schematically disclosed apparatus. Different mount structures may be used. Positive means for holding a mount against a positioning screw might also be used. Therefore, it is an object of the appended claims to cover all such modifications and variations as come within the true spirit and scope of the claims.

What I claim as new and desire to secure by Letters Patent of the United States is:

1. In a magnetic head mounting system including a magnetic transducer, a suspension member for supporting the magnetic transducer and a movable carriage unit along a suspension axis, the improvement of means for mounting the suspension member to the carriage unit, said mounting means comprising:

A. a mount affixed to the suspension member for mounting the suspension member and head in the carriage, said mount including a flat surface portion and an end portion;

B. adjustable stop means for engaging said end portion to thereby position said mount in the carriage along the suspension axis; and C. a locking unit with a surface thereon for engaging said flat surface to thereby prevent rotation of said mount about the suspension axis in the carriage during axial displacement.

2. A magnetic head mounting system as recited in claim 1 wherein said locking means comprises:

A. a locking screw with a conical end portion, and

B. a flat on said mount engaging said conical end portion.

3. In a magnetic disk storage unit with a rotatable record, a magnetic transducer disposed in operative association with opposite sides of the record, a suspension member for each transducer lying generally along a suspension axis parallel to a record radius, and a carriage for moving the transducers along their respective suspension axes, the carriage having a pair of spaced, vertically aligned, horizontal bores, the improvement of means for connecting each transducer to the carriage unit for facilitating alignment of individual transducers with their respective record surfaces, said connecting means comprising:

A. an adjustable stop means mounted in the carriage for each bore,

B. a mount in each bore with one end affixed to a respective one of the suspension members and extending generally along a respective one of the suspension axes, each of said mounts having a supporting portion partially cylindrical outer surface for engaging the carriage in the bore, an end of said supporting portion defining a wedging surface in alignment with a respective one of said adjustable stop means and an intermediate portion spaced from said end, and lugs offset from said end and intermediate portions, each lug having a partially cylindrical surface forming a bearing surface which interfits on the bore opposite one of said mounts being oppositely oriented about its suspension axis with respect to the other, whereby said adjustable stop means for each mounting member is accessible from the top of said carriage, said adjustable stop means for the lower mount passing said upper mount at positions offset from said lugs.

4. A magnetic disk assembly as recited in claim 3 additionally comprising:

A. flats formed at said intermediate portions; and

B. locking units for each mount vertically aligned for engaging one flat to lock said mounts in place and, during alignment, to nunize head rotation.

5. A magnetic disk storage unit as recited in claim 4 wherein:

A. each locking unit comprises a screw mounting along an axis intersecting the bore for its respective mount, each screw having a conical end portion, and B. said flat on each mount engaging said conical surface along a substantial portion of the length thereof.

* * * * *